United States Patent
Watkins, II et al.

[11] Patent Number: 6,105,610
[45] Date of Patent: Aug. 22, 2000

[54] CARTRIDGE VALVE WITH TRIPLE SEQUENTIAL SEAL

[75] Inventors: W. J. Watkins, II, Nashua, N.H.; Enrique L. Kilayko, Spruce Head, Me.

[73] Assignee: Liquid Metronics Incorporated, Acton, Mass.

[21] Appl. No.: 09/334,206

[22] Filed: Jun. 15, 1999

Related U.S. Application Data

[63] Continuation-in-part of application No. 09/023,750, Feb. 13, 1998, abandoned.

[51] Int. Cl.[7] .................................................. F16K 15/04
[52] U.S. Cl. ............................ 137/516.29; 137/533.15; 137/539
[58] Field of Search .................... 137/533.11, 516.29, 137/533.15, 539, 539.5, 516.27; 251/361

[56] References Cited

U.S. PATENT DOCUMENTS

| | | | |
|---|---|---|---|
| 2,676,782 | 4/1954 | Bostock et al. | 137/539.5 |
| 3,009,476 | 11/1961 | Usab | 137/516.29 |
| 3,091,254 | 5/1963 | Kilayko | 137/516.29 |
| 3,802,807 | 4/1974 | Kilayko | 417/430 |
| 4,197,875 | 4/1980 | Schieferstein et al. | 137/533.11 |
| 4,474,208 | 10/1984 | Looney | 137/516.29 |
| 4,687,019 | 8/1987 | Mayfield | 137/516.29 |
| 4,781,213 | 11/1988 | Kilayko | 137/516.29 |
| 4,932,434 | 6/1990 | Taylor | 137/539.5 |
| 5,046,645 | 9/1991 | Hagan et al. | 137/516.29 |
| 5,383,648 | 1/1995 | Pipinias | 251/333 |

*Primary Examiner*—Denise L. Ferensic
*Assistant Examiner*—Joanne Y. Kim
*Attorney, Agent, or Firm*—Marshall O'Toole Gerstein Murray & Borun

[57] ABSTRACT

A valve includes a valve body including a recess therein, a valve element movably disposed in the recess and a seal member disposed in the recess. The seal member has first, second and third separate and distinct sealing surfaces which are engageable by the valve element in response to fluid pressure in the recess.

26 Claims, 4 Drawing Sheets

CARTRIDGE VALVE WITH TRIPLE SEQUENTIAL SEAL

CROSS-REFERENCE TO RELATED APPLICATION

This is a continuation-in-part of U.S. application Ser. No. 09/023,750, filed Feb. 13, 1998, and entitled "Cartridge Valve with Triple Sequential Seal."

TECHNICAL FIELD

The present invention relates generally to fluid valves, and more particularly to a cartridge valve utilizing a valve element and a seal.

BACKGROUND ART

Valves are often used in applications where a fluid is pumped at substantial pressures. For example, Kilayko U.S. Pat. No. 4,781,213 discloses a ball check valve which may be used in a chemical metering pump. The valve includes a ball closure element which is movable away from a fluid port during a pressure stroke and which is movable toward the fluid port into engagement with an O-ring during a suction stroke. When a particular fluid pressure is reached in the valve, the ball closure element contacts a ball stop surface adjacent to and downstream from the O-ring. In this manner, the ball closure element is prevented from compressing the O-ring beyond a certain limit so that distortion and wear of the O-ring are minimized.

Pipinias U.S. Pat. No. 5,383,648 discloses a flow controlling valve including a valve plenum in fluid communication with fluid entrance and fluid discharge ports. An O-ring is disposed in the plenum atop a passage opening leading to the fluid discharge port and a structural component is provided which can be advanced to exert pressure against the O-ring. As the structural component is advanced, the O-ring is flattened against a surface, thereby causing the O-ring to partially or fully block off the passage opening.

Schieferstein et al. U.S. Pat. No. 4,197,875 discloses a ball check valve including an elastomeric sealing element surrounding an outlet port and disposed in contact with seating surfaces. A central opening of the sealing element is concentric with a fluid port and a ball seats against a ball sealing surface surrounding the central opening.

SUMMARY OF THE INVENTION

A valve provides positive sealing without sticking of the valve element even under substantial fluid pressures.

More particularly, according to one aspect of the present invention, a valve includes a valve body having a recess therein, a valve element movably disposed in the recess and a seal member disposed in the recess. The seal member has first, second and third separate and distinct sealing surfaces which are engageable by the valve element in response to fluid pressure in the recess.

Preferably, the seal member is fabricated of an elastomer. Also preferably, the valve element comprises a ball. Still further, each of the first, second and third sealing surfaces may be circular in shape. Also, the valve element preferably engages the first sealing surface but does not engage the second and third sealing surfaces when a first fluid pressure is in the recess and preferably engages the first and second sealing surfaces but does not engage the third sealing surface when a second fluid pressure greater than the first fluid pressure is in the recess. In addition, the valve element preferably engages the first, second and third sealing surfaces when a third fluid pressure greater than the second fluid pressure is in the recess.

In accordance with another aspect of the present invention, a cartridge valve includes a valve body having a recess therein disposed between a pair of ports and a flexible seal member disposed in the recess and including first, second and third separate and distinct sealing surfaces. A ball is disposed within and movable in the recess between an open position at which the ports are in fluid communication with one another and a closed position at which the ball is in contact with one or more of the first, second and third sealing surfaces to isolate the ports from one another.

In accordance with yet another aspect of the present invention, a cartridge valve includes a valve body having a recess therein disposed between a pair of ports and an elastomeric seal member disposed in the recess and including first, second and third separate and distinct sealing surfaces. Each of the sealing surfaces is circular in shape and is formed at an intersection between perpendicular surfaces. A ball is disposed within and movable in the recess between an open position at which the ports are in fluid communication with one another and a closed position at which the ball is in contact with at least one of the first, second and third sealing surfaces to isolate the ports from one another.

In accordance with a still further aspect of the present invention, a valve includes a valve body having a recess therein, a valve element movably disposed in the recess and a seal member disposed in the recess and having first, second and third separate and distinct sealing surfaces wherein the sealing surfaces are engageable by the valve element in response to fluid pressure in the recess. The seal member is fabricated of an elastomer and the first sealing surface has a first radius of curvature and the second and third sealing surfaces have radii of curvature greater than or equal to the first radius of curvature.

The valve of the present invention obtains a positive seal without substantial wedging of the valve element in the seal member. Valve performance is thus improved.

DESCRIPTION OF THE PREFERRED EMBODIMENTS

Figure 1:
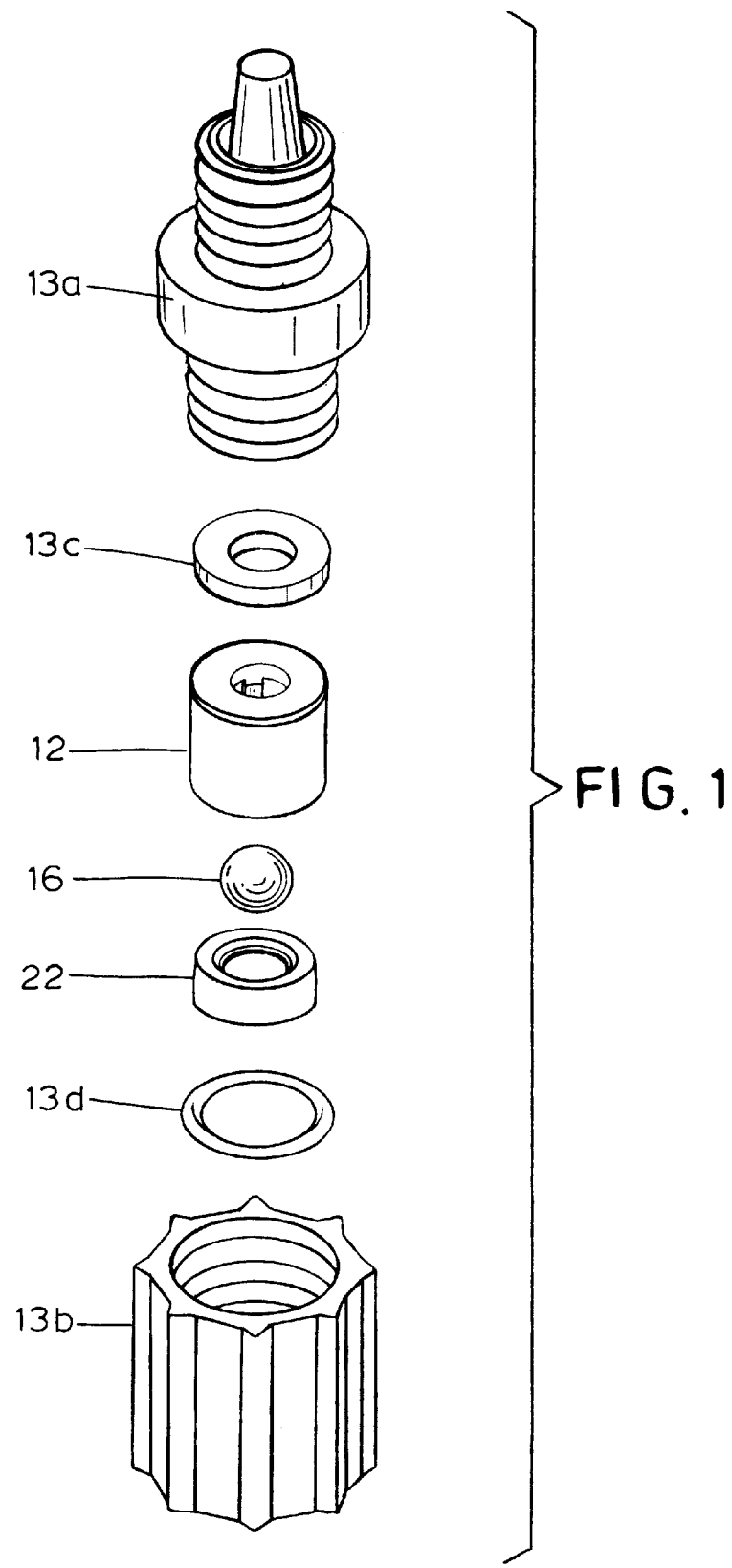
FIG. 1 is an isometric exploded view of the valve of the present invention.

Referring now to the Figs., a cartridge valve 10 for use in, for example, a pump (not shown), includes a valve body 12 captured in a space between threaded first and second bodies comprising a valve housing 13a and a valve coupling 13b (FIG. 1). A washer 13c and an O-ring 13d are also disposed in the space between the valve housing 13a and the valve coupling 13b.

The valve body 12 includes a recess 14 therein and a valve element in the form of a ball 16 is movably disposed in the recess 14 between first and second ports 18, 20. A seal member 22 is retained in the recess 14 by an interference or press fit of a tapered outer cylindrical surface 23 with a cylindrical wall 24 of the valve body 12 defining the recess 14. The seal member 22 is further captured between a shoulder 25 of the valve body 12 and a surface (not shown) of the valve coupling 13b.

Figure 2:
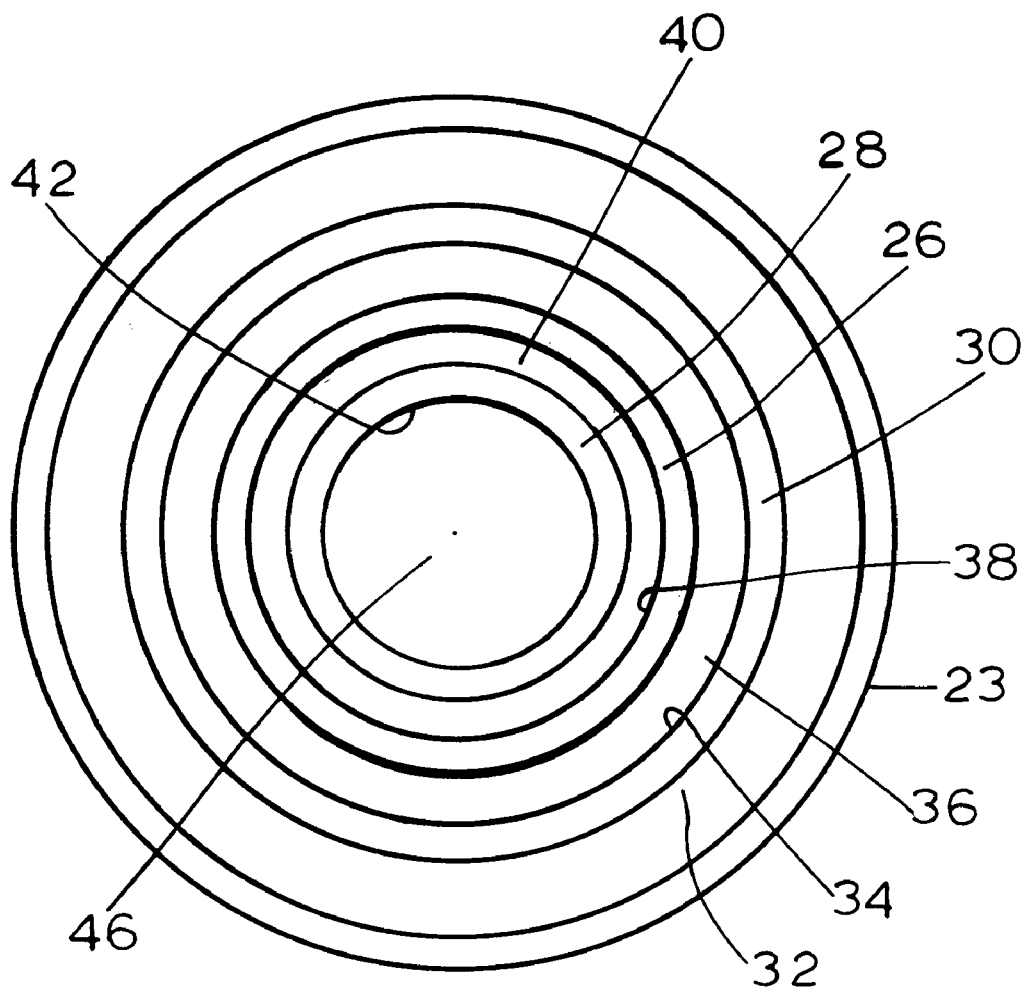
FIG. 2 is a plan view of the seal member of FIG. 1.
Figure 4:
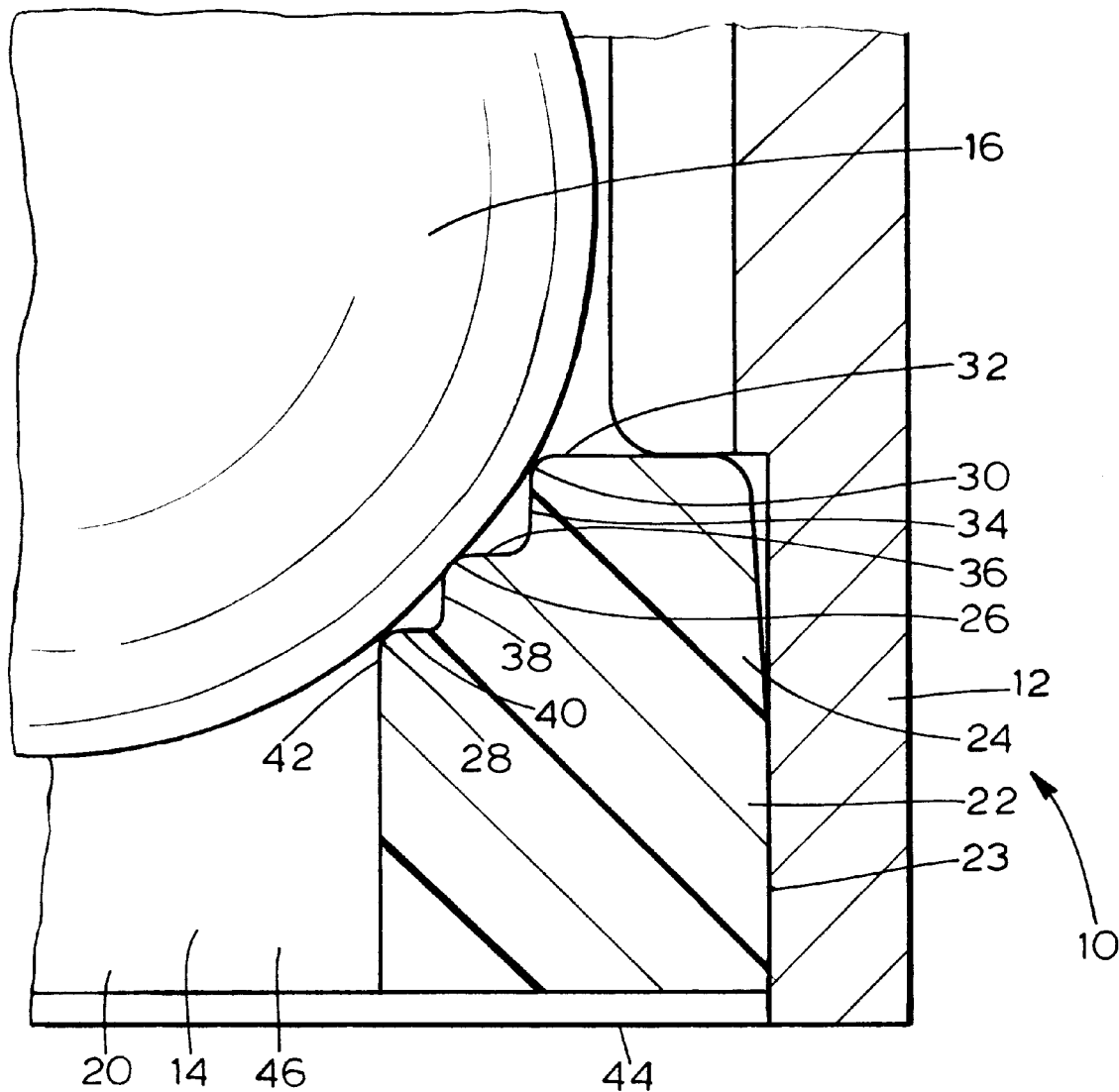
FIG. 4 is an enlarged fragmentary sectional view of the valve element and a portion of the seal member of FIG. 3 with the ball shown in contact with the seal member.

Preferably, the seal member 22 is flexible and, in the preferred embodiment, is made of a suitable elastomeric material. As seen specifically in FIG. 2, the seal member includes three or more sealing surfaces 26, 28 and 30 (hereinafter first through third sealing surfaces, respectively) each of which is formed at an intersection between substantially perpendicular surfaces 32, 34, 36, 38, 40 and 42 (FIGS. 2 and 4). Preferably, although not necessarily, the outside surface 23 of the seal member 22 is circular in plan view (FIG. 2), as are the sealing surfaces 26, 28 and 30 and the remaining surfaces 32-42. Further, the surface 42 extends fully through the seal member 22 to a bottom surface 44 thereby to define a circular passage 46.

Figure 3:
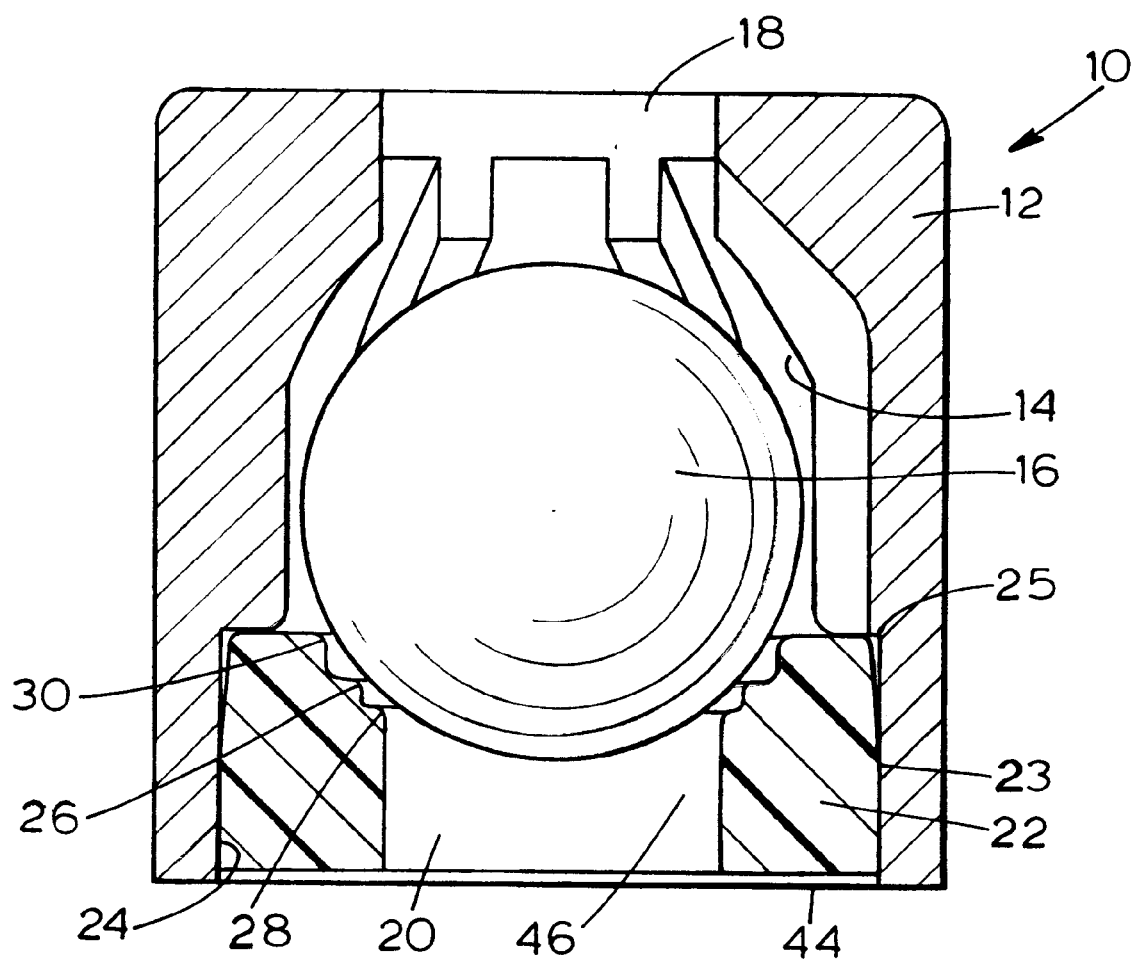
FIG. 3 is a sectional view of the valve of FIG. 1 in assembled condition with the ball shown spaced from the seal member.

In operation, when the fluid pressure at the port 20 exceeds the fluid pressure at the port 18, the ball 16 moves upwardly as seen in FIG. 3 out of contact with the seal member 22 so that fluid flow can take place between the ports 18 and 20. Alternatively, when the fluid pressure at the port 18 rises relative to the fluid pressure at the port 20, the ball 16 moves into sealing contact with the seal member 22. Specifically, as the pressure differential rises to a first level the ball 16 contacts the first sealing surface 26 but not the second and third sealing surfaces 28, 30 to close the fluid path and thereby isolate the ports 18, 20 from one another. During this pressure differential rise, the ball 16 (which is made of any suitable hard material) deforms the seal member 22. Eventually, a second fluid pressure differential level higher than the first level may be reached wherein the seal member 22 is sufficiently deformed to permit the ball 16 to seal against the second sealing surface 28 as well as the first sealing surface 26 (but not the third sealing surface). Thereafter, increasing fluid differential level causes continued deformation of the seal member until a third fluid pressure differential is reached, whereupon the ball 16 contacts and seals against all three sealing surfaces 26, 28 and 30. The sequential engagement of the ball 16 with the first, second and third sealing surfaces 26, 28 and 30 with increasing pressure differential results in an increasing sealing area with pressure to limit the penetration of the ball 16 into the seal member 22. This feature increases resistance to "wedging" or sticking of the ball 16 and the seal member 22 so that the response of the ball 16 to changing pressure conditions is improved. In addition, sliding of the ball 16 against the seal member 22 is minimized, thus reducing wear and improving service life.

In order to achieve the foregoing effect, the sealing surfaces 26, 28 and 30 should define surface(s) other than a spherical surface having the same radius as the ball 16 so that the surfaces are engaged by the ball 16 at different pressure differentials. Alternatively, if desired, two or more of the sealing surfaces may define a sphere having the same radius as the ball 16 (or any other surface substantially matching the outer surface of the valve member if such member is not spherical).

Advantageously, the radii of curvature of the sealing surfaces 26, 28 and 30 may be selected to obtain an operational benefit not realized by prior art devices. Specifically, the radius of curvature of the sealing surface 26 may be selected to be equal to or less than the radii of curvature of the sealing surfaces 28 and 30. Even more specifically, the radius of curvature of the sealing surface 26 may be less than or equal to 0.010 inch, and preferably substantially equal to 0.003 to 0.005 inch. The radii of curvature of either or both of the sealing surfaces 28 and 30 may be greater than or equal to 0.010 inch, and preferably equal to approximately 0.015 to 0.020 inch. In this form of the invention, the radius of curvature of the sealing surface 26 is equal to or less than one-third the radii of curvature of the sealing surfaces 28 and 30. Further, the radius of curvature of the sealing surface 28 may be the same or different than the radius of curvature of the sealing surface 30. In any case, initial sealing engagement of the ball 16 with the sealing surface 26 is facilitated, even under conditions of low fluid pressure differentials across the ball 16, owing to the sharp radius of curvature of the sealing surface 26. Subsequent engagement of the ball 16 with the sealing surfaces 28 and 30 prevents substantial scrubbing and sticking of the ball 16 with the sealing surface 26, thereby limiting wear of the sealing surface 26. Thus, reverse flow of fluid through the valve 10 is substantially prevented, even under low reverse pressure conditions, without the undue and unwanted sealing surface wear that would otherwise result.

While the present invention has been shown in the context of a cartridge-type check valve, the present invention is not limited to use in such a device, and may instead be used in any other type of valve.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A valve, comprising:
   a valve body including a recess therein;
   a valve element movably disposed in the recess; and
   a unitary seal member disposed in the recess and having step-shaped walls and first, second and third separate and distinct sealing surfaces which are engageable by the valve element in response to fluid pressure in the recess.

2. The valve of claim 1, wherein the seal member is fabricated of an elastomer.

3. The valve of claim 1, wherein the valve element comprises a ball.

4. The valve of claim 1, wherein each of the first, second and third sealing surfaces is circular in shape.

5. The valve of claim 1, wherein the valve element engages the first sealing surface but does not engage the second and third sealing surfaces when a first fluid pressure is in the recess and engages the first and second sealing surfaces but does not engage the third sealing surface when a second fluid pressure greater than the first fluid pressure is in the recess and engages the first, second and third sealing surfaces when a third fluid pressure greater than the second fluid pressure is in the recess.

6. The valve of claim 1, wherein the first sealing surface has a first radius of curvature and the second and third sealing surfaces have radii of curvature greater than or equal to the first radius of curvature.

7. The valve of claim 6, wherein the first radius of curvature is less than or equal to one-third the second and third radii of curvature.

8. The valve of claim 6, wherein the first radius of curvature is substantially equal to 0.003 inch to 0.005 inch and each of the second and third radii of curvature is substantially equal to 0.015 to 0.020 inch.

9. A cartridge valve, comprising:
   a valve body having a recess therein disposed between a pair of ports;
   a unitary flexible seal member disposed in the recess and including step-shaped walls and first, second and third separate and distinct sealing surfaces; and
   a ball disposed within and movable in the recess between an open position at which the ports are in fluid communication with one another and a closed position at which the ball is in contact with one or more of the first, second and third sealing surfaces to isolate the ports from one another.

10. The cartridge valve of claim 9, wherein the seal member is fabricated of an elastomer.

11. The valve of claim 9, wherein each of the first, second and third sealing surfaces is circular in shape.

12. The valve of claim 9, wherein the valve element engages the first sealing surface but does not engage the second and third sealing surfaces when a first fluid pressure is in the recess and engages the first and second sealing surfaces but does not engage the third sealing surface when a second fluid pressure greater than the first fluid pressure is in the recess and engages the first, second and third sealing surfaces when a third fluid pressure greater than the second fluid pressure is in the recess.

13. The valve of claim 9, wherein the first sealing surface has a first radius of curvature and the second and third sealing surfaces have radii of curvature greater than or equal to the first radius of curvature.

14. The valve of claim 13, wherein the first radius of curvature is less than or equal to one-third the second and third radii of curvature.

15. The valve of claim 13, wherein the first radius of curvature is substantially equal to 0.003 inch to 0.005 inch and each of the second and third radii of curvature is substantially equal to 0.015 to 0.020 inch.

16. A cartridge valve, comprising:
   a valve body having a recess therein disposed between a pair of ports;
   a unitary elastomeric seal member disposed in the recess and including step-shaped walls and first, second and third separate and distinct sealing surfaces, each of the sealing surfaces being circular in shape and formed at an intersection between substantially perpendicular surfaces; and
   a ball disposed within and movable in the recess between an open position at which the ports are in fluid communication with one another and a closed position at which the ball is in contact with at least one of the first, second and third sealing surfaces to isolate the ports from one another.

17. The valve of claim 16, wherein the first sealing surface is disposed between the second and third sealing surfaces and wherein the valve element engages the first sealing surface but does not engage the second and third sealing surfaces when a first fluid pressure is in the recess and engages the first and second sealing surfaces but does not engage the third sealing surface when a second fluid pressure greater than the first fluid pressure is in the recess and engages the first, second and third sealing surfaces when a third fluid pressure greater than the second fluid pressure is in the recess.

18. The valve of claim 17, wherein the first sealing surface has a first radius of curvature and the second and third sealing surfaces have radii of curvature greater than or equal to the first radius of curvature.

19. The valve of claim 18, wherein the first radius of curvature is less than or equal to one-third the second and third radii of curvature.

20. The valve of claim 19, wherein the first radius of curvature is substantially equal to 0.003 inch to 0.005 inch and each of the second and third radii of curvature is substantially equal to 0.015 to 0.020 inch.

21. A valve, comprising:
   a valve body including a recess therein;
   a valve element movably disposed in the recess; and
   a unitary seal member disposed in the recess and having step-shaped walls and first, second and third separate and distinct sealing surfaces which are engageable by the valve element in response to fluid pressure in the recess, wherein the seal member is fabricated of an elastomer and wherein the first sealing surface has a first radius of curvature and the second and third sealing surfaces have radii of curvature greater than or equal to the first radius of curvature.

22. The valve of claim 21, wherein the valve element comprises a ball.

23. The valve of claim 22, wherein each of the first, second and third sealing surfaces is circular in shape.

24. The valve of claim 23, wherein the valve element engages the first sealing surface but does not engage the second and third sealing surfaces when a first fluid pressure is in the recess and engages the first and second sealing surfaces but does not engage the third sealing surface when a second fluid pressure greater than the first fluid pressure is in the recess and engages the first, second and third sealing surfaces when a third fluid pressure greater than the second fluid pressure is in the recess.

25. The valve of claim 24, wherein the first radius of curvature is less than or equal to one-third the second and third radii of curvature.

26. The valve of claim 24, wherein the first radius of curvature is substantially equal to 0.003 inch to 0.005 inch and each of the second and third radii of curvature is substantially equal to 0.015 to 0.020 inch.

* * * * *